United States Patent
Aldehayyat et al.

(10) Patent No.: US 10,250,059 B2
(45) Date of Patent: Apr. 2, 2019

(54) CHARGING CIRCUIT FOR BATTERY-POWERED DEVICE

(71) Applicant: Microsoft Technology Licensing, LLC, Redmond, WA (US)

(72) Inventors: Yazan Aldehayyat, Seattle, WA (US); Ricardo Márquez Reyes, Redmond, WA (US); Manish K. Shah, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 74 days.

(21) Appl. No.: 15/269,726

(22) Filed: Sep. 19, 2016

(65) Prior Publication Data
US 2018/0083470 A1  Mar. 22, 2018

(51) Int. Cl.
H02J 7/00 (2006.01)
H02M 3/158 (2006.01)
H02J 3/32 (2006.01)

(52) U.S. Cl.
CPC ......... *H02J 7/0068* (2013.01); *H02M 3/1582* (2013.01); *H02J 3/32* (2013.01); *H02J 7/0055* (2013.01); *H02J 2007/0059* (2013.01)

(58) Field of Classification Search
CPC .... H02J 7/0068; H02J 2007/0059; H02J 3/32; H02J 7/0055
See application file for complete search history.

(56) References Cited

U.S. PATENT DOCUMENTS

| 6,326,771 B1 * | 12/2001 | Popescu-Stanesti ........................ H02J 7/0068 320/139 |
| 7,088,595 B2 * | 8/2006 | Nino .................... H02M 3/1582 363/132 |
| 7,528,582 B1 | 5/2009 | Ferguson |

(Continued)

FOREIGN PATENT DOCUMENTS

| CN | 103346606 A | 10/2013 |
| WO | 2015099794 A1 | 7/2015 |

OTHER PUBLICATIONS

"ISL95521 Hybrid Power Boost and Narrow VDC Configurations Combination Battery Charger with SMBus Interface", Published on: May 8, 2016 Available at: http://www.intersil.com/content/intersil/en/products/power-management/battery-management/multiple-cell-battery-chargers/ISL95521.html.

(Continued)

*Primary Examiner* — Helen Rossoshek
(74) *Attorney, Agent, or Firm* — Alleman Hall Creasman & Tuttle LLP

(57) ABSTRACT

A charging circuit comprises a power node electrically connectable to a power supply unit, a battery node electrically connectable to a battery, a device node electrically connected to a device load, a reversible buck-boost converter operatively intermediate the power node and the battery node, a first switch operatively intermediate the power node and the device node, a second switch operatively intermediate the battery node and the device node; and logic operatively connected to the first switch, the second switch, and the reversible buck-boost converter. The logic is configured to operate the first switch, the second switch, and the reversible buck-boost converter based on a plurality of different conditions.

20 Claims, 2 Drawing Sheets

(56) References Cited

U.S. PATENT DOCUMENTS

| | | | |
|---|---|---|---|
| 8,055,917 B2 | 11/2011 | Cha | |
| 8,098,056 B2* | 1/2012 | Yamazaki | H02M 3/157 323/222 |
| 8,406,025 B1* | 3/2013 | Alexander | H02M 5/225 363/132 |
| 8,536,840 B2* | 9/2013 | Walter | H02J 7/0068 323/223 |
| 9,218,043 B2 | 12/2015 | Wei et al. | |
| 9,397,506 B2* | 7/2016 | Keates | H01M 10/425 |
| 9,423,448 B1* | 8/2016 | Naiknaware | G01R 31/405 |
| 2006/0187689 A1 | 8/2006 | Hartular | |
| 2009/0015229 A1 | 1/2009 | Kotikalapoodi | |
| 2012/0139345 A1 | 6/2012 | Ye et al. | |
| 2012/0286579 A1* | 11/2012 | Mourra | H02J 7/35 307/80 |
| 2013/0088203 A1 | 4/2013 | Solie | |
| 2013/0200815 A1* | 8/2013 | Schie | G05F 3/08 315/224 |
| 2013/0320954 A1* | 12/2013 | Capofreddi | G05F 3/08 323/311 |
| 2013/0339757 A1 | 12/2013 | Reddy | |
| 2014/0009105 A1* | 1/2014 | Keates | H01M 10/425 320/103 |
| 2014/0009106 A1* | 1/2014 | Andrea | H02H 9/002 320/107 |
| 2014/0229748 A1 | 8/2014 | Li et al. | |
| 2014/0281591 A1 | 9/2014 | Uan-Zo-Li et al. | |
| 2014/0355308 A1 | 12/2014 | Uan-Zo-Li et al. | |
| 2015/0229252 A1* | 8/2015 | Toba | H02M 7/5387 318/400.27 |
| 2015/0280486 A1* | 10/2015 | Hsu | B60L 11/1818 320/107 |
| 2015/0372526 A1* | 12/2015 | Greening | G06F 1/263 320/134 |
| 2016/0202743 A1* | 7/2016 | Li | G06F 1/26 710/313 |
| 2016/0246316 A1 | 8/2016 | Lim et al. | |

OTHER PUBLICATIONS

"Understanding USB-C Buck-Boost Battery Charging", Published on: Feb. 10, 2016 Available at: http://www.polyscope.ch/site/assets/files/42679/06_16_09.pdf.

Liang, et al., "Evaluation of Narrow Vdc-Based Power Delivery Architecture in Mobile Computing System", In IEEE Transactions on Industry Applications, vol. 47, No. 6, Nov. 2011, pp. 2539-2548.

Jeong, et al., "Optimized Design of Bi-Directional Dual Active Bridge Converter for Low-Voltage Battery Charger", In Journal of Power Electronics, vol. 14, No. 3, May 2014, pp. 468-477.

"International Search Report and Written Opinion Issued in PCT Application No. PCT/US2017/051240", dated Dec. 8, 2017, 11 Pages.

* cited by examiner

CHARGING CIRCUIT FOR BATTERY-POWERED DEVICE

BACKGROUND

An electronic device that utilizes a rechargeable battery may be connectable to a power supply unit to provide power to charge the rechargeable battery as well as to provide power to a load of the electronic device. Additionally, the electronic device may include a charging circuit configured to manage charging of the electronic device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A charging circuit includes a power node electrically connectable to a power supply unit, a battery node electrically connectable to a battery, and a device node electrically connected to a device load. The charging circuit also includes a reversible buck-boost converter operatively intermediate the power node and the battery node, a first switch operatively intermediate the power node and the device node, and a second switch operatively intermediate the battery node and the device node. Logic of the charging circuit is configured to operate the first switch, the second switch, and the reversible buck-boost converter based on conditions of the power supply unit, the battery, and the device load.

DETAILED DESCRIPTION

The present disclosure is directed to a battery charging topology for use with electronic devices. The disclosed topology is compatible with power supply units and batteries having virtually any standard voltages. When the power supply voltage is different than the battery voltage, the disclosed topology automatically steps up or steps down the voltage of the power supply unit. Therefore, the disclosed topology is able to power the electronic device directly and/or charge the battery from virtually any power supply unit, even if the voltage of the power supply unit is lower than the voltage of the battery. Furthermore, if the electronic device draws more current than the power supply unit is capable of delivering, the disclosed topology automatically uses the battery to supplement the power supply unit. Further still, the disclosed topology is able to power the electronic device without incurring the power losses that are characteristic of conventional narrow voltage DC charging topologies.

Figure 1:
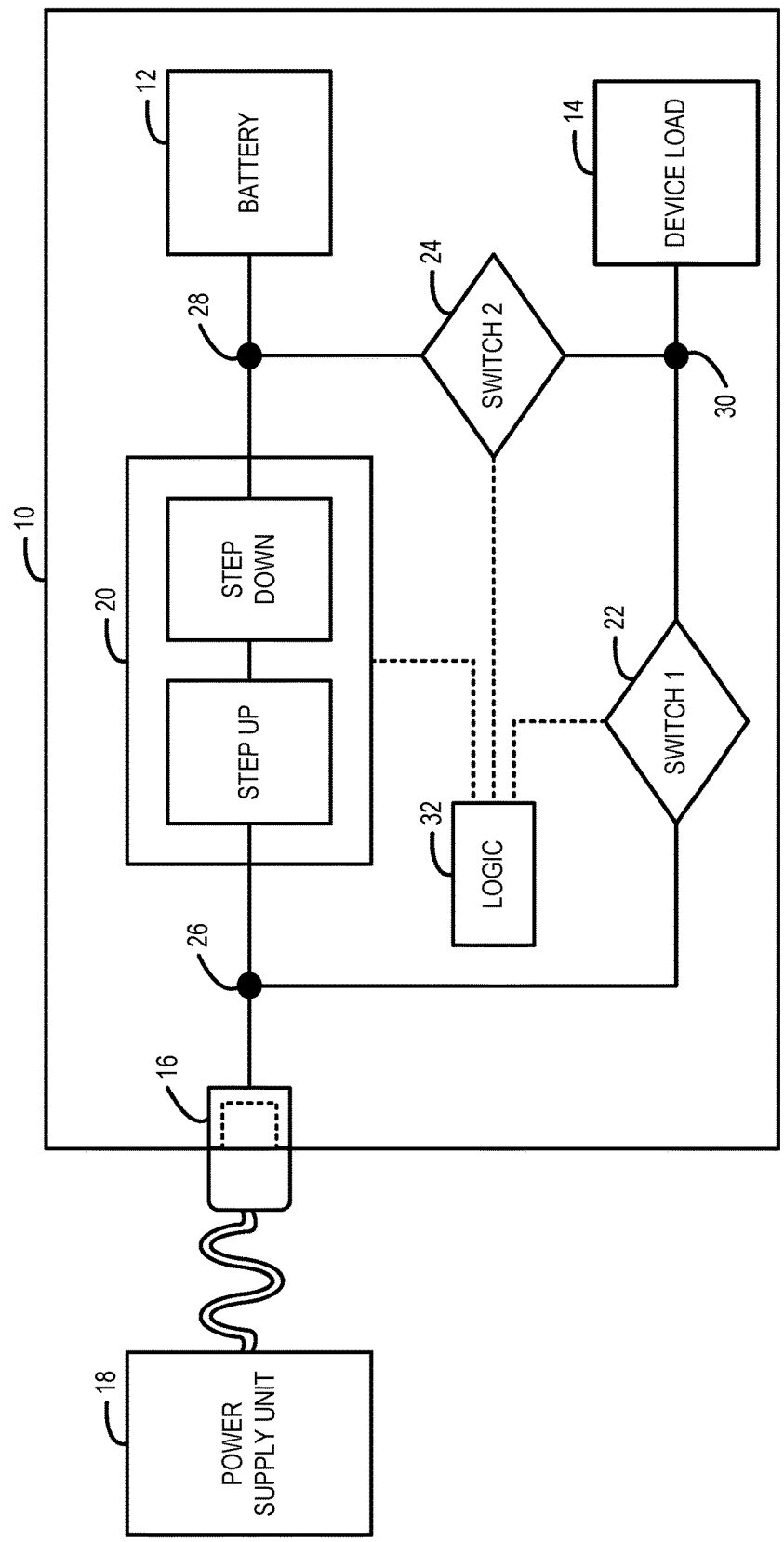
FIG. 1 shows an example electronic device including a rechargeable battery and a charging circuit.

FIG. 1 schematically shows an example electronic device 10 that includes a rechargeable battery 12 and a device load 14. Electronic device 10 can take virtually any form, including, but not limited to, a laptop computer, a tablet computer, a smart phone, a virtual reality device, and a wearable computing device. In general, the disclosed charging topology is compatible with virtually any electronic device that utilizes a rechargeable battery.

Device load 14 includes one or more power consuming components. The set of power consuming components can vary depending on the type of electronic device. Non-limiting examples of power consuming components that may be included as part of the device load 14 are electronic displays, integrated circuits, sensors, and audio amplifiers. In general, the device load may include any component that draws electrical power.

As schematically shown in FIG. 1, electronic device 10 includes a power interface 16 that is configured to receive power from a power supply unit 18. In some implementations, the power interface 16 allows the electronic device 10 to be selectively connected and disconnected from the power supply unit 18. When connected, the power supply unit can power the electronic device and/or charge the battery 12. When disconnected, the electronic device draws power from the battery 12 and can be used as a mobile device that need not be tethered to a stationary power source. Non-limiting examples of power interface 16 include the various Universal Serial Bus connector receptacles or plugs (e.g., Type A, Type B, Type C, Micro-A, Micro-B, Mini-A, Mini-B, charging downstream port, dedicated charging port). Other detachable interfaces are also envisaged, and power interface 16 is in no way limited to Universal Serial Bus receptacles or plugs. In some implementations, the power interface 16 may include an inductive coupling configured to wirelessly receive power. In some implementations, the electronic device may include a dedicated power supply unit and the power interface may be hard-wired. In general, any interface that allows a transfer of electrical power may be used.

The power supply unit 18 may be configured to supply a direct current (DC) voltage. In some examples, the power supply unit 18 may include an alternating current (AC) to DC converter. In some examples, the power supply unit may include one or more solar cells configured to convert light energy into DC power and/or a fuel cell configured to convert chemical energy into DC power.

Electronic device 10 also includes a reversible buck-boost converter 20, a first switch 22, and a second switch 24. The reversible buck-boost converter 20 is operatively intermediate a power node 26 and a battery node 28. The first switch 22 is operatively intermediate the power node 26 and a device node 30. The second switch is operatively intermediate the battery node 28 and the device node 30. The power node 26 is electrically connectable to the power supply unit 18 via power interface 16. The battery node 28 is electrically connectable to the battery 12. In some implementations, the battery 12 is hardwired to the battery node 28; and in some implementations, the battery may be selectively removable from the electronic device and thus disconnected from the battery node 28. The device node 30 is electrically connected to the device load 14.

Reversible buck-boost converter 20 is operable in a plurality of different modes including a forward buck mode, a forward boost mode, a reverse buck mode, and a reverse boost mode. In the forward buck mode, the reversible buck-boost converter 20 receives power from the power node 26 at an input voltage, steps down the input voltage to a lower output voltage, and outputs power to the battery node 28 at the lower output voltage. In the forward boost mode, the reversible buck-boost converter 20 receives power from the power node 26 at an input voltage, steps up the input voltage to a higher output voltage, and outputs power to the battery node 28 at the higher output voltage. In the reverse buck mode, the reversible buck-boost converter 20 receives power from the battery node 28 at an input voltage, steps down the input voltage to a lower output voltage, and outputs power to the power node 26 at the lower output voltage. In the reverse boost mode, the reversible buck-boost converter 20 receives power from the battery node 28 at an input voltage, steps up the input voltage to a higher output voltage, and outputs power to the power node 26 at the higher output voltage.

While a reversible buck-boost converter is described above, any bidirectional step up/down circuitry may be operatively intermediate the power node 26 and the battery node 28. The bidirectional step up/down circuitry may be configured to step-up and step down voltage in both directions. The bidirectional step up/down circuitry may take any suitable form. In one example, the bidirectional step up/down circuitry may include one or more variable transformers. In another example, the bidirectional step up/down circuitry may include a buck converter arranged in parallel with a boost converter.

Electronic device 10 also includes logic 32 operatively connected to the reversible buck-boost converter 20, first switch 22, and second switch 24. In some implementations, logic 32 and aspects of reversible buck-boost converter 20 may be incorporated into an integrated circuit (e.g., application specific integrated circuit). In some implementations, logic 32 may be implemented by an integrated circuit and reversible buck-boost converter 20 may be cooperatively implemented by the integrated circuit and complimentary componentry.

Logic 32 is configured to set the first switch 22, the second switch 24, and the reversible buck-boost converter 20 based on conditions of the power supply unit 18, the battery 12, and the device load 14. The charging topology of electronic device 10 provides a high degree of flexibility and supports efficient charging and device powering under a wide range of operating conditions.

Electronic device 10 may include any suitable componentry for sensing existing operating conditions. In one example, logic 32 is configured to monitor a discharge current of the power supply unit 18. Further, logic 32 is configured to set a mode of operation (e.g., set first switch, 22, second switch, 24, and reversible buck-boost converter 20) based on the determined discharge current of the power supply unit 18.

A first operating condition is characterized by a voltage from the power supply unit 18 being greater than a voltage of the battery 12, and a power requirement of the device load 14 being less than a power capability of the power supply unit 18. Under such conditions, logic 32 is configured to turn on (i.e., open) the first switch 22, turn off (i.e., close) the second switch 24, and operate the reversible buck-boost converter 20 in the forward buck mode. As such, the device load is fully satisfied by power from power supply unit 18, and battery 12 is charged with stepped down power from the power supply unit 18.

A second operating condition is characterized by a voltage from the power supply unit 18 being greater than a voltage of the battery 12, and a power requirement of the device load 14 being greater than a power capability of the power supply unit 18. Under such conditions, logic 32 is configured to turn on the first switch 22, turn off the second switch 24, and operate the reversible buck-boost converter 20 in a reverse boost mode. As such, the device load is partially satisfied by power from power supply unit 18 and partially satisfied by stepped up power from the battery 12.

A third operating condition is characterized by a voltage from the power supply unit 18 being less than a voltage of the battery 12, and a power requirement of the device load 14 being less than a power capability of the power supply unit 18. Under such conditions, logic 32 is configured to turn on the first switch 22, turn off the second switch 24, and operate the reversible buck-boost converter 20 in a forward boost mode. As such, the device load is fully satisfied by power from power supply unit 18, and battery 12 is charged with stepped up power from the power supply unit 18.

A fourth operating condition is characterized by a voltage from the power supply unit 18 being less than a voltage of the battery 12, and a power requirement of the device load 14 being greater than a power capability of the power supply unit 18. Under such conditions, logic 32 is configured to turn on the first switch 22, turn off the second switch 24, and operate the reversible buck-boost converter 20 in a reverse buck mode. As such, the device load is partially satisfied by power from power supply unit 18 and partially satisfied by stepped down power from the battery.

A fifth operating condition is characterized by the power supply unit 18 being disconnected from the power node (i.e., the electronic device 10 is not plugged in). Under such conditions, logic 32 is configured to turn off the first switch 22, turn on the second switch 24, and turn off the reversible buck-boost converter 20. As such, the device load is fully satisfied by power from the battery 12.

A sixth operating condition is characterized by a voltage from the power supply unit 18 being less than a voltage threshold of the device load 14, and a power requirement of the device load 14 being less than a power capability of the power supply unit 18. Under such conditions, logic 32 is configured to turn off the first switch 22, turn on the second switch 24, and operate the reversible buck-boost converter 20 in the forward boost mode. As such, the device load is fully satisfied by stepped up power from the power supply unit 18, and the battery 12 is charged with stepped up power from the power supply unit 18.

A seventh operating condition is characterized by a voltage from the power supply unit 18 being less than a voltage threshold of the device load 14, and a power requirement of the device load 14 being greater than a power capability of the power supply unit 18. Under such conditions, logic 32 is configured to turn off the first switch 22, turn on the second switch 24, and operate the reversible buck-boost converter 20 in the forward boost mode. As such, the device load is partially satisfied by power stepped up from power supply unit 18 and partially satisfied by power from the battery. In other words, the battery discharges power during the seventh conditions. The threshold at which battery assist begins may be set in logic 32.

Figure 2:
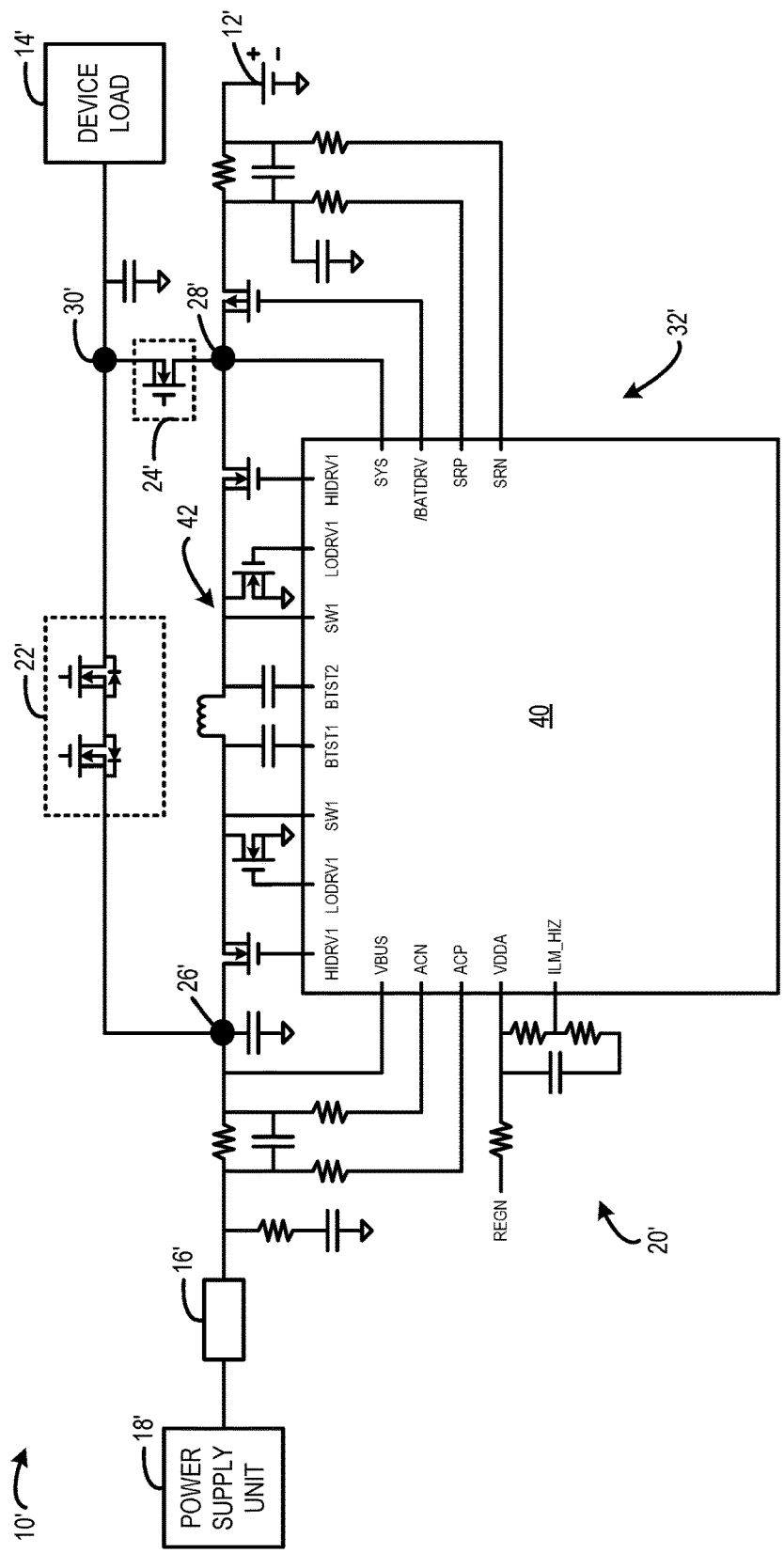
FIG. 2 shows an example charging circuit for a battery-powered device.

FIG. 2 shows an example circuit 10'. Circuit 10' is an example implementation of the charging topology described with reference to electronic device 10 of FIG. 1. Circuit 10' includes a battery 12', a device load 14', and a power interface 16'. Circuit 10' also includes an integrated circuit 40 and componentry 42 that cooperatively serve as a reversible buck-boost converter 20' and logic 32'. For example, the componentry may include a plurality of switches/transistors. More particularly, the componentry may include MOSFETs. Further, an inductor operatively intermediate a first pair of transistors and a second pair of transistors may be a component of the reversible buck-boost converter 20'. Circuit 10' also includes a power node 26', a battery node 28', and a device node 30'. Circuit 10' is not intended to be limiting, as the power charging topology generally described with reference to FIG. 1 may be variously implemented.

In an example, a charging circuit, comprises a power node electrically connectable to a power supply unit, a battery node electrically connectable to a battery, a device node electrically connected to a device load, a reversible buck-boost converter operatively intermediate the power node and the battery node, a first switch operatively intermediate the power node and the device node, a second switch operatively intermediate the battery node and the device node, and logic operatively connected to the first switch, the second switch, and the reversible buck-boost converter. The logic is configured to, based on first conditions, turn on the first switch, turn off the second switch, and operate the reversible buck-boost converter in a forward buck mode. The logic is configured to, based on second conditions, turn on the first switch, turn off the second switch, and operate the reversible buck-boost converter in a reverse boost mode. The logic is configured to, based on third conditions, turn on the first switch, turn off the second switch, and operate the reversible buck-boost converter in a forward boost mode. The logic is configured to, based on fourth conditions, turn on the first switch, turn off the second switch, and operate the reversible buck-boost converter in a reverse buck mode. The logic is configured to, based on fifth conditions, turn off the first switch, turn on the second switch, and turn off the reversible buck-boost converter.

In this example and/or other examples, the first conditions may include a voltage at the power node from the power supply unit being greater than a voltage of the battery and a power requirement of the device load being less than a power capability of the power supply unit.

In this example and/or other examples, the second conditions may include a voltage at the power node from the power supply unit being greater than a voltage of the battery and a power requirement of the device load being greater than a power capability of the power supply unit.

In this example and/or other examples, the third conditions may include a voltage at the power node from the power supply unit being less than a voltage of the battery and a power requirement of the device load being less than a power capability of the power supply unit.

In this example and/or other examples, the fourth conditions may include a voltage at the power node from the power supply unit being less than a voltage of the battery and a power requirement of the device load being greater than a power capability of the power supply unit. In this example and/or other examples, the fifth conditions may include the power supply unit being disconnected from the power node.

In this example and/or other examples, based on sixth conditions, the logic may be further configured to turn off the first switch, turn on the second switch, and operate the reversible buck-boost converter in the forward boost mode.

In this example and/or other examples, the sixth conditions may include a voltage at the power node from the power supply unit being less than a voltage threshold of the device load and a power requirement of the device load being less than a power capability of the power supply unit.

In this example and/or other examples, the battery may be charged with power during the sixths conditions. In this example and/or other examples, based on seventh conditions, the logic may be further configured to turn off the first switch, turn on the second switch, and operate the reversible buck-boost converter in the forward boost mode, and the seventh conditions may include a voltage at the power node from the power supply unit being less than a voltage threshold of the device load and a power requirement of the device load being greater than a power capability of the power supply unit.

In this example and/or other examples, the battery may discharge power during the seventh conditions.

In this example and/or other examples, the power node may be electrically connected to a power interface.

In this example and/or other examples, the power interface may include a universal serial bus connector.

In this example and/or other examples, the first switch and the second switch may include MOSFETs. In this example and/or other examples, the reversible buck-boost converter may include an inductor operatively intermediate a first pair of transistors and a second pair of transistors.

In an example, an electronic device, comprises a power interface configured to receive power from a power supply unit, a battery, a reversible buck-boost converter operatively intermediate the power interface and the battery, a device load including one or more power consuming components, a first switch operatively intermediate the power interface and the device load, a second switch operatively intermediate the battery and the device load, and logic operatively connected to the first switch, the second switch, and the reversible buck-boost converter. The logic is configured to, based on first conditions, turn on the first switch, turn off the second switch, and operate the reversible buck-boost converter in a forward buck mode. The logic is configured to, based on second conditions, turn on the first switch, turn off the second switch, and operate the reversible buck-boost converter in a reverse boost mode. The logic is configured to, based on third conditions, turn on the first switch, turn off the second switch, and operate the reversible buck-boost converter in a forward boost mode. The logic is configured to, based on fourth conditions, turn on the first switch, turn off the second switch, and operate the reversible buck-boost converter in a reverse buck mode. The logic is configured to, based on fifth conditions, turn off the first switch, turn on the second switch, and turn off the reversible buck-boost converter.

In this example and/or other examples, the logic may be further configured to, based on sixth conditions, turn off the first switch, turn on the second switch, and operate the reversible buck-boost converter in the forward boost mode. The sixth conditions may include a voltage from the power supply unit being less than a voltage threshold of the device load and a power requirement of the device load being less than a power capability of the power supply unit.

In this example and/or other examples, the logic may be further configured, based on seventh conditions, to turn off the first switch, turn on the second switch, and operate the reversible buck-boost converter in the forward boost mode. The seventh conditions may include a voltage from the power supply unit being less than a voltage threshold of the device load and a power requirement of the device load being greater than a power capability of the power supply unit.

In this example and/or other examples, the power interface may include a universal serial bus connector.

In an example, an electronic device, comprises a power interface configured to receive power from a power supply unit, a battery, bidirectional step up/down circuitry operatively intermediate the power interface and the battery, a device load including one or more power consuming components, a first switch operatively intermediate the power interface and the device load, a second switch operatively intermediate the battery and the device load, and logic operatively connected to the first switch, the second switch, and the bidirectional step up/down circuitry, The logic is configured to set the first switch, the second switch, and the bidirectional step up/down circuitry based on conditions of the power supply unit, the battery, and the device load.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A charging circuit, comprising:
a power node electrically connectable to a power supply unit;
a battery node electrically connectable to a battery;
a device node electrically connected to a device load;
a reversible buck-boost converter operatively intermediate the power node and the battery node;
a first switch operatively intermediate the power node and the device node;
a second switch operatively intermediate the battery node and the device node, such that electrical current from the battery node does not flow to the device node without passing through the reversible buck-boost converter when the second switch is turned off; and
logic operatively connected to the first switch, the second switch, and the reversible buck-boost converter, the logic configured to:
based on first conditions, turn on the first switch, turn off the second switch, and operate the reversible buck-boost converter in a forward buck mode;
based on second conditions, turn on the first switch, turn off the second switch, and operate the reversible buck-boost converter in a reverse boost mode;
based on third conditions, turn on the first switch, turn off the second switch, and operate the reversible buck-boost converter in a forward boost mode;
based on fourth conditions, turn on the first switch, turn off the second switch, and operate the reversible buck-boost converter in a reverse buck mode; and
based on fifth conditions, turn off the first switch, turn on the second switch, and turn off the reversible buck-boost converter.

2. The charging circuit of claim 1, wherein the first conditions include a voltage at the power node from the power supply unit being greater than a voltage of the battery and a power requirement of the device load being less than a power capability of the power supply unit.

3. The charging circuit of claim 1, wherein the second conditions include a voltage at the power node from the power supply unit being greater than a voltage of the battery and a power requirement of the device load being greater than a power capability of the power supply unit.

4. The charging circuit of claim 1, wherein the third conditions include a voltage at the power node from the power supply unit being less than a voltage of the battery and a power requirement of the device load being less than a power capability of the power supply unit.

5. The charging circuit of claim 1, wherein the fourth conditions include a voltage at the power node from the power supply unit being less than a voltage of the battery and a power requirement of the device load being greater than a power capability of the power supply unit.

6. The charging circuit of claim 1, wherein the fifth conditions include the power supply unit being disconnected from the power node.

7. The charging circuit of claim 1, wherein, based on sixth conditions, the logic is further configured to turn off the first switch, turn on the second switch, and operate the reversible buck-boost converter in the forward boost mode.

8. The charging circuit of claim 7, wherein the sixth conditions include a voltage at the power node from the power supply unit being less than a voltage threshold of the device load and a power requirement of the device load being less than a power capability of the power supply unit.

9. The charging circuit of claim 8, wherein the battery is charged with power during the sixths conditions.

10. The charging circuit of claim 1, wherein, based on seventh conditions, the logic is further configured to turn off the first switch, turn on the second switch, and operate the reversible buck-boost converter in the forward boost mode, and wherein the seventh conditions include a voltage at the power node from the power supply unit being less than a voltage threshold of the device load and a power requirement of the device load being greater than a power capability of the power supply unit.

11. The charging circuit of claim 10, wherein, the battery discharges power during the seventh conditions.

12. The charging circuit of claim 1, wherein the power node is electrically connected to a power interface.

13. The charging circuit of claim 12, wherein the power interface includes a universal serial bus connector.

14. The charging circuit of claim 1, wherein the first switch and the second switch include MOSFETs.

15. The charging circuit of claim 1, wherein the reversible buck-boost converter includes an inductor operatively intermediate a first pair of transistors and a second pair of transistors.

16. An electronic device, comprising:
a power interface configured to receive power from a power supply unit;
a battery;
a reversible buck-boost converter operatively intermediate the power interface and the battery;
a device load including one or more power consuming components;
a first switch operatively intermediate the power interface and the device load;
a second switch operatively intermediate the battery and the device load, such that electrical current from the battery node does not flow to the device node without passing through the reversible buck-boost converter when the second switch is turned off; and
logic operatively connected to the first switch, the second switch, and the reversible buck-boost converter, the logic configured to:
based on first conditions, turn on the first switch, turn off the second switch, and operate the reversible buck-boost converter in a forward buck mode;
based on second conditions, turn on the first switch, turn off the second switch, and operate the reversible buck-boost converter in a reverse boost mode;

based on third conditions, turn on the first switch, turn off the second switch, and operate the reversible buck-boost converter in a forward boost mode;

based on fourth conditions, turn on the first switch, turn off the second switch, and operate the reversible buck-boost converter in a reverse buck mode; and based on fifth conditions, turn off the first switch, turn on the second switch, and turn off the reversible buck-boost converter.

17. The electronic device of claim 16, wherein, based on sixth conditions, the logic is further configured to turn off the first switch, turn on the second switch, and operate the reversible buck-boost converter in the forward boost mode, and wherein the sixth conditions include a voltage from the power supply unit being less than a voltage threshold of the device load and a power requirement of the device load being less than a power capability of the power supply unit.

18. The electronic device of claim 17, wherein based on seventh conditions, the logic is further configured to turn off the first switch, turn on the second switch, and operate the reversible buck-boost converter in the forward boost mode, and wherein the seventh conditions include a voltage from the power supply unit being less than a voltage threshold of the device load and a power requirement of the device load being greater than a power capability of the power supply unit.

19. The electronic device of claim 16, wherein the power interface includes a universal serial bus connector.

20. An electronic device, comprising:
a power interface configured to receive power from a power supply unit;
a battery;
bidirectional step up/down circuitry operatively intermediate the power interface and the battery;
a device load including one or more power consuming components;
a first switch operatively intermediate the power interface and the device load;
a second switch operatively intermediate the battery and the device load, such that electrical current from the battery does not flow to the device load without passing through the bidirectional step up/down circuitry when the second switch is turned off; and
logic operatively connected to the first switch, the second switch, and the bidirectional step up/down circuitry, the logic configured to set the first switch, the second switch, and the bidirectional step up/down circuitry based on conditions of the power supply unit, the battery, and the device load.

\* \* \* \* \*